(12) United States Patent
Tsaur et al.

(10) Patent No.: US 9,372,762 B2
(45) Date of Patent: Jun. 21, 2016

(54) SYSTEMS AND METHODS FOR RESTORING APPLICATION DATA

(75) Inventors: Ynn-Pyng Tsaur, Oviedo, FL (US); Ping Wang, Heathrow, FL (US); Michael Payne, Archer, FL (US)

(73) Assignee: Veritas Technologies LLC, Mountain View, CA (US)

( * ) Notice: Subject to any disclaimer, the term of this patent is extended or adjusted under 35 U.S.C. 154(b) by 788 days.

(21) Appl. No.: 13/314,771

(22) Filed: Dec. 8, 2011

(65) Prior Publication Data

US 2013/0151477 A1    Jun. 13, 2013

(51) Int. Cl.
G06F 17/00 (2006.01)
G06F 11/14 (2006.01)
G06F 7/00 (2006.01)
G06F 17/30 (2006.01)

(52) U.S. Cl.
CPC ........ *G06F 11/1469* (2013.01); *G06F 11/1461* (2013.01); *G06F 17/30076* (2013.01); *G06F 17/30123* (2013.01)

(58) Field of Classification Search
None
See application file for complete search history.

(56) References Cited

U.S. PATENT DOCUMENTS

| | | | |
|---|---|---|---|
| 5,537,532 A * | 7/1996 | Chng et al. | 714/4.2 |
| 6,023,710 A | 2/2000 | Steiner et al. | |
| 6,628,660 B1 * | 9/2003 | Morse | G05B 19/045 370/395.7 |
| 7,096,392 B2 * | 8/2006 | Sim-Tang | 714/48 |
| 7,802,134 B1 | 9/2010 | Sobel et al. | |
| 7,831,861 B1 | 11/2010 | Greene et al. | |
| 2006/0010174 A1 * | 1/2006 | Nguyen et al. | 707/202 |
| 2007/0185922 A1 * | 8/2007 | Kapoor et al. | 707/202 |
| 2007/0266394 A1 * | 11/2007 | Odent | G06Q 10/06 719/316 |
| 2008/0059736 A1 * | 3/2008 | Murayama et al. | 711/162 |
| 2008/0307347 A1 * | 12/2008 | Cisler et al. | 715/771 |
| 2009/0327362 A1 | 12/2009 | Shah et al. | |
| 2011/0153567 A1 | 6/2011 | Sawdon et al. | |
| 2011/0178996 A1 * | 7/2011 | Pendlebury et al. | 707/692 |
| 2012/0151272 A1 * | 6/2012 | Behrendt | G06F 9/542 714/39 |

FOREIGN PATENT DOCUMENTS

EP    1635244    3/2006

* cited by examiner

*Primary Examiner* — Usmaan Saeed
*Assistant Examiner* — Yu Zhao
(74) *Attorney, Agent, or Firm* — ALG Intellectual Property, LLC (57) ABSTRACT

A computer-implemented method for restoring application data may include (1) receiving a request to restore resource data for a resource to a selected state, (2) identifying a plurality of backup datasets, each backup dataset within the plurality of backup datasets including at least a portion of backed up data for the resource, (3) determining an order in which to restore the plurality of backup datasets in order to restore the resource data to the selected state, and (4) restoring the resource data for the resource to the selected state by restoring the plurality of backup datasets in the order as determined. Various other methods, systems, and computer-readable media are also disclosed.

20 Claims, 7 Drawing Sheets

SYSTEMS AND METHODS FOR RESTORING APPLICATION DATA

BACKGROUND

In the digital age, organizations increasingly rely on digitally-stored data. To protect against data loss, an organization may use one or more backup systems to back up important data.

Due to increasingly complex information technology infrastructures, an organization may create backups using a variety of methods, potentially with differing scopes and/or according to different schedules. In some cases, multiple backups may provide partially overlapping protection to some data sets. Accordingly, an administrator wishing to restore data may have to sift through a large number of backups. Furthermore, the administrator may need to restore data from multiple backups in order to bring a computing system or resource back to a desired state. The selection of backups and the order in which they are restored may further depend on what the administrator wishes to restore (e.g., a full volume, a selection of files, a database, etc.). Given the potential complexity of backup configurations and restoration options, restoring data to a desired state may cost an administrator significant time and effort and/or potentially lead to user error. Accordingly, the instant disclosure identifies and addresses a need for additional and improved systems and methods for restoring application data.

SUMMARY

As will be described in greater detail below, the instant disclosure generally relates to systems and methods for restoring application data by identifying the backup datasets needed to restore computing resources to desired states and ordering the backup datasets for restorations to restore computing resources to desired states. In one example, a computer-implemented method for performing such a task may include (1) receiving a request to restore resource data for a resource to a selected state, (2) identifying a plurality of backup datasets, each backup dataset within the plurality of backup datasets including at least a portion of backed up data for the resource, (3) determining an order in which to restore the plurality of backup datasets in order to restore the resource data to the selected state, and (4) restoring the resource data for the resource to the selected state by restoring the plurality of backup datasets in the order as determined.

The resource may include any of a variety of resources. For example, the resource may include an application, a database, and/or a group of files. In some examples, the resource may include a file system. In these examples, determining the order in which to restore the plurality of backup datasets may include (1) placing a most recent full backup dataset first in the order, (2) placing a most recent differential backup dataset after the most recent full backup dataset in the order, and (3) placing a plurality of incremental backup datasets in chronological order after the most recent differential backup dataset.

The plurality of backup datasets may include any of a variety of backup datasets generated in any of a variety of contexts. In one example, (1) a first backup dataset within the plurality of backup datasets may have been generated from a first backup source, (2) a second backup dataset within the plurality of backup datasets may have been generated from a second backup source, and (3) the first backup source and the second backup source may differ in scope. Additionally or alternatively, (1) a first backup dataset within the plurality of backup datasets may have been generated by a first backup job, (2) a second backup dataset within the plurality of backup datasets may have been generated from a second backup job, and (3) the first backup job and the second backup job may have been mutually independent. In some examples, (1) a first backup dataset within the plurality of backup datasets may have been generated by a first backup job, (2) a second backup dataset within the plurality of backup datasets may have been generated from a second backup job, and (3) the first backup job and the second backup job may have been performed by distinct backup systems. In one example, (1) a first backup dataset within the plurality of backup datasets may have been generated by a first backup system operating within a virtual machine and (2) a second backup dataset within the plurality of backup datasets may have been generated by a second backup system operating on a host of the virtual machine.

In some embodiments, identifying the plurality of backup datasets may include (1) identifying a most recent full backup dataset including the resource data and (2) identifying each backup dataset within a backup environment generated subsequent to the most recent full backup dataset and including at least a portion of the resource data. In these examples, determining the order in which to restore the plurality of backup datasets may include (1) identifying a type of the resource, (2) identifying, based on the type of the resource, a corresponding finite state machine for ordering the plurality of backup datasets, and (3) applying the plurality of backup datasets to the corresponding finite state machine as input in reverse chronological order. In some examples, the corresponding finite state may include a plurality of transitions conditioned on a backup method of each backup dataset within the plurality of backup datasets.

In one embodiment, a system for implementing the above-described method may include (1) a receiving module programmed to receive a request to restore resource data for a resource to a selected state, (2) an identification module programmed to identify a plurality of backup datasets, each backup dataset within the plurality of backup datasets including at least a portion of backed up data for the resource, (3) a determination module programmed to determine an order in which to restore the plurality of backup datasets in order to restore the resource data to the selected state, and (4) a restoration module programmed to restore the resource data for the resource to the selected state by restoring the plurality of backup datasets in the order as determined. The system may also include at least one processor configured to execute the receiving module, the identification module, the determination module, and the restoration module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive a request to restore resource data for a resource to a selected state, (2) identify a plurality of backup datasets, each backup dataset within the plurality of backup datasets including at least a portion of backed up data for the resource, (3) determine an order in which to restore the plurality of backup datasets in order to restore the resource data to the selected state, and (4) restore the resource data for the resource to the selected state by restoring the plurality of backup datasets in the order as determined.

As will be explained in greater detail below, by identifying the backup datasets needed to restore computing resources to desired states and ordering the backup datasets for restorations to restore computing resources to desired states, the systems and methods described herein may simplify the task of restoring data in complex backup environments, thereby potentially saving time and effort for administrators and/or preventing human error.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
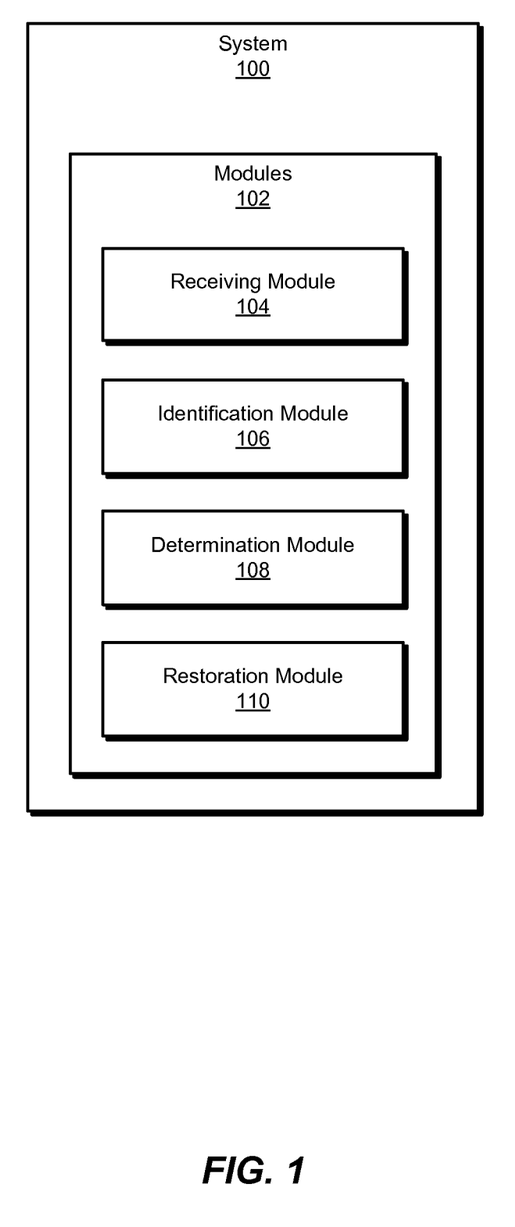
FIG. 1 is a block diagram of an exemplary system for restoring application data.
Figure 2:
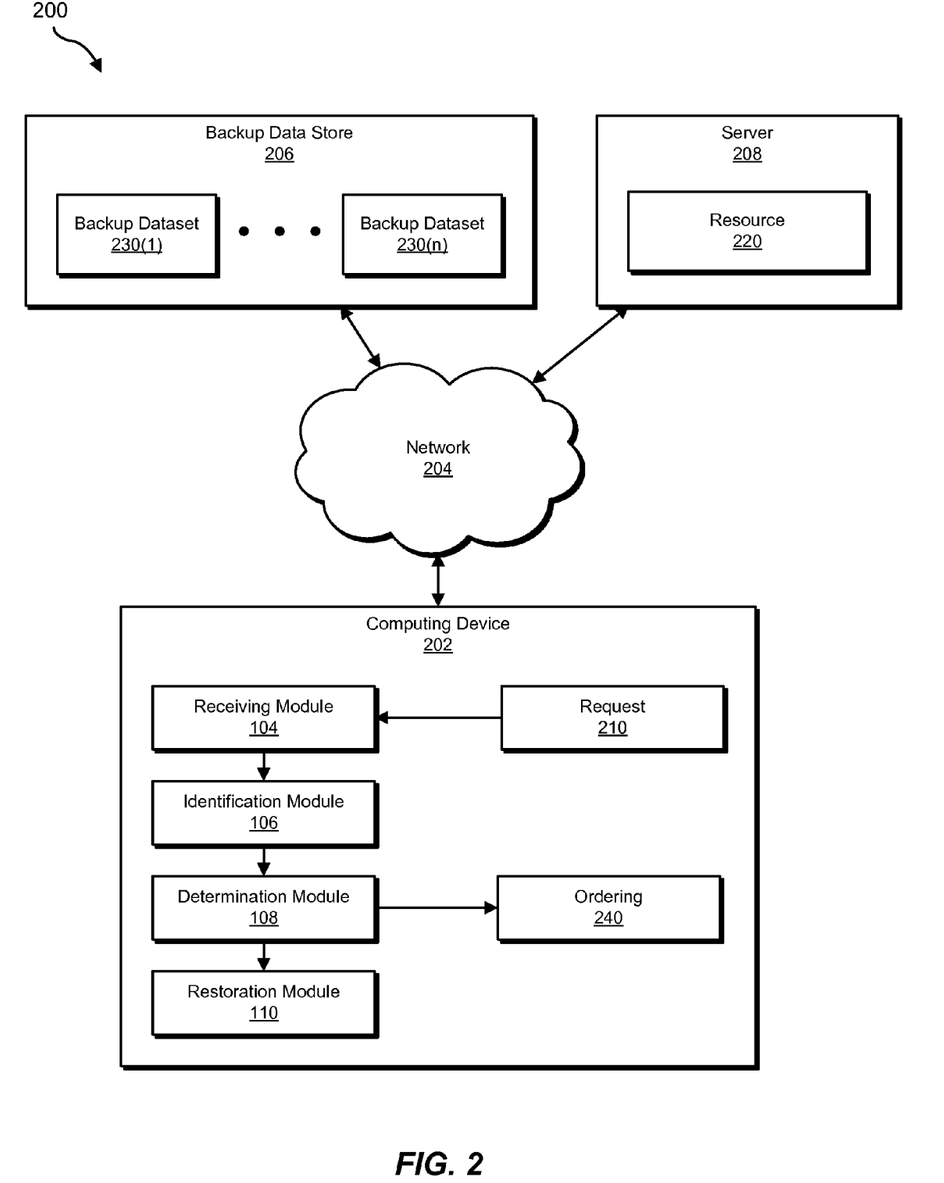
FIG. 2 is a block diagram of an exemplary system for restoring application data.

The following will provide, with reference to FIGS. 1-2, detailed descriptions of exemplary systems for restoring application data. Detailed descriptions of corresponding computer-implemented methods will also be provided in connection with FIG. 3. Detailed descriptions of exemplary finite state machines will be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for restoring application data. As illustrated in this figure, exemplary system 100 may include one or more modules 102 for performing one or more tasks. For example, and as will be explained in greater detail below, exemplary system 100 may include a receiving module 104 programmed to receive a request to restore resource data for a resource to a selected state. Exemplary system 100 may also include an identification module 106 programmed to identify a plurality of backup datasets, each backup dataset within the plurality of backup datasets including at least a portion of backed up data for the resource.

In addition, and as will be described in greater detail below, exemplary system 100 may include a determination module 108 programmed to determine an order in which to restore the plurality of backup datasets in order to restore the resource data to the selected state. Exemplary system 100 may additionally include a restoration module 110 programmed to restore the resource data for the resource to the selected state by restoring the plurality of backup datasets in the order as determined. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, backup data store 206, and/or server 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a backup data store 206 and a server 208 via a network 204. For example, an administrator may use computing device 202 to restore a resource 220 on server 208 to a previous state using backup data within backup data store 206.

In one embodiment, one or more of modules 102 from FIG. 1 may, when executed by at least one processor of computing device 202, facilitate computing device 202 in restoring application data. For example, and as will be described in greater detail below, one or more of modules 102 may cause computing device 202 to (1) receive a request (e.g., a request 210) to restore resource data for a resource (e.g., resource 220) to a selected state, (2) identify a plurality of backup datasets (e.g., backup datasets 230(1)-(n)), each backup dataset within the plurality of backup datasets including at least a portion of backed up data for the resource, (3) determine an order in which to restore the plurality of backup datasets in order to restore the resource data to the selected state (e.g., an ordering 240), and (4) restore the resource data for the resource to the selected state by restoring the plurality of backup datasets in the order as determined (e.g., restore resource 220 to the selected state by restoring backup datasets 230(1)-(n) according to ordering 240).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Backup data store 206 may represent portions of a single database or storage device or a plurality of databases or storage devices. For example, backup data store 206 may represent a portion computing system 610 in FIG. 6 and/or portions of exemplary network architecture 700 in FIG. 7. Alternatively, backup data store 206 in FIG. 1 may represent one or more physically separate devices capable of being accessed by a computing device, such as computing device 202 and/or server 208 in FIG. 2, computing system 610 in FIG. 6, and/or portions of exemplary network architecture 700 in FIG. 7.

Server 208 generally represents any type or form of computing device that is capable of storing, managing, and/or providing a resource. Examples of server 208 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202, backup data store 206, and server 208.

Figure 3:
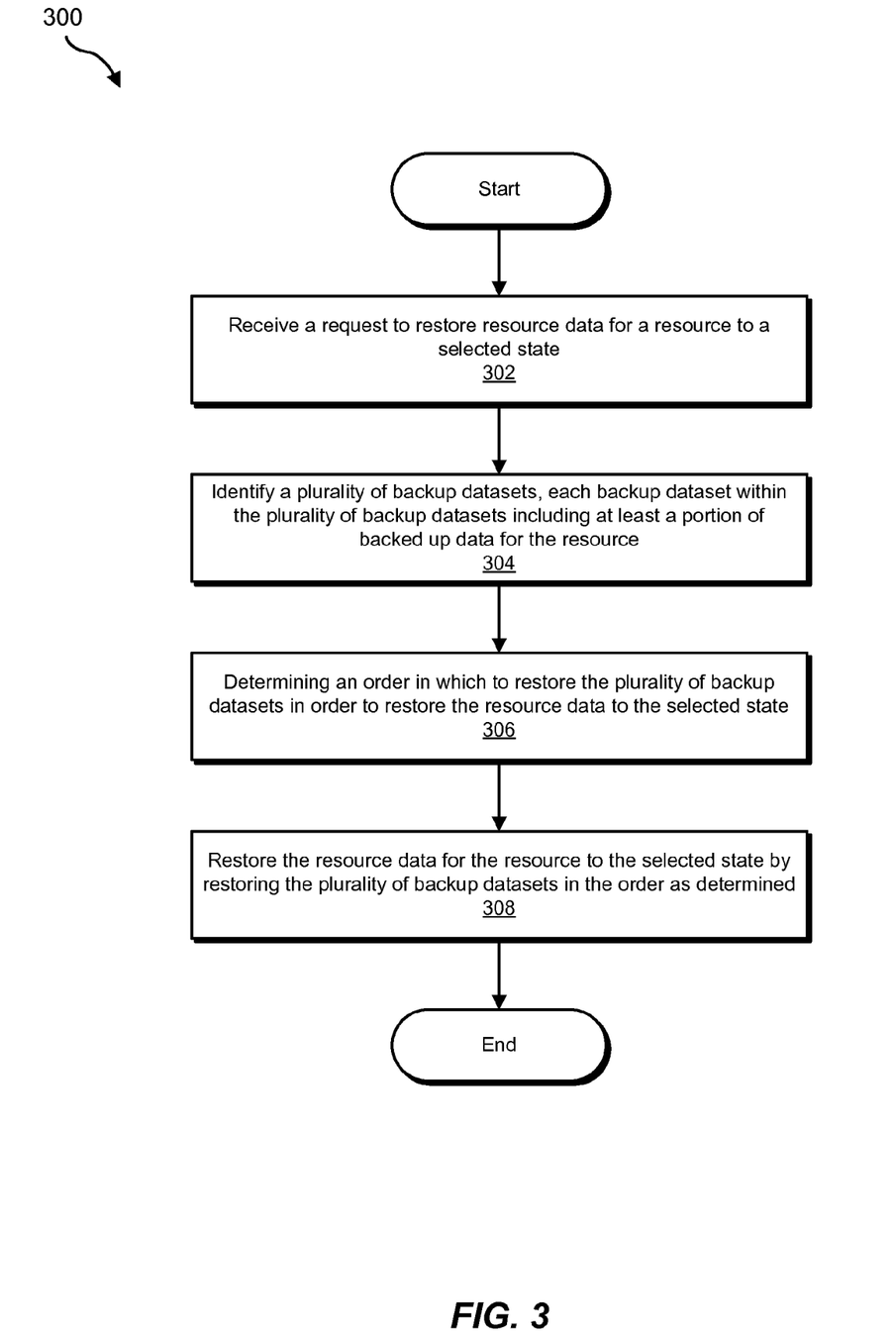
FIG. 3 is a flow diagram of an exemplary method for restoring application data.

FIG. 3 is a flow diagram of an exemplary computer-implemented method 300 for restoring application data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive a request to restore resource data for a resource to a selected state. For example, at step 302 receiving module 104 may, as part of computing device 202 in FIG. 2, receive request 210 to restore resource data for resource to a selected state.

As used herein, the term "resource" may refer to any computing resource that includes and/or uses data. For example, the term "resource" may refer to an application (e.g., MICROSOFT EXCHANGE, MICROSOFT SHAREPOINT, IBM LOTUS DOMINO, etc.), a database (e.g., an SQL database), and/or a group of files (e.g., a defined volume, directory, and/or list of files). In some examples, as will be explained in greater detail below, the resource may include a file system. The phrase "resource data," as used herein, may refer to any data included in and/or used by a resource. In some examples, resource data may include primary data stored, manipulated, and/or used by a resource (e.g., an application). Additionally or alternatively, resource data may include configuration data and/or system metadata that the state and/or function of the resource. In some examples, resource data of the resource may include data corresponding to an additional resource on which the resource depends.

Receiving module 104 may receive the request in any of a variety of formats. In some examples, the request to restore resource data for the resource may identify the resource on a logical level (e.g., by name, by a business logic identifier that locates the resource within a business logic representation) instead of and/or in addition to identifying the resource in terms of data locations (e.g., storage device addresses, file system locations, network addresses, etc.) Accordingly, in some examples, the selected state may identify the state to which the resource is to be restored on a logical level. For example, the request may specify the selected state in terms of a view of the resource on an application level and/or otherwise abstract or high level.

Request module 104 may receive the request in any of a variety of contexts. For example, request module 104 may receive the request from a selection made by a user during a logical restore presentation, where the resource is presented on a logical level to the user. In this example, the user may view one or more logical states of the resource to which the resource may be restored. For example, the user may select to restore a file system based on a point-in-time file system view constructed from and/or corresponding to the combination of one or more backup datasets. As another example, the user may select to restore an SQL database based on a synthesized SQL database view constructed from and/or corresponding to the combination of one or more backup datasets. In some examples, the request may identify the selected state with a specified point-in-time. Additionally or alternatively, the request may identify the selected state according to a specified application-level event (e.g., to before a specified job was processed by the resource, to before a warning was generated by the resource, etc.).

Returning to FIG. 3, at step 304 one or more of the systems described herein may identify a plurality of backup datasets, each backup dataset within the plurality of backup datasets including at least a portion of backed up data for the resource. For example, at step 304 identification module 106 may, as part of computing device 202 in FIG. 2, identify backup datasets 230(1)-(n).

As used herein, the phrase "backup dataset" may refer to any collection of data representing a backup and/or a component of a backup of a resource and/or a protected collection of data. In some examples, the phrase "backup dataset" may refer to a collection of data usable, in alone or in combination with other data, for restoring resource data.

The plurality of backup datasets may include any of a variety of backup datasets. In some examples, the plurality of backup datasets may include backup datasets created according to differing backup methods. For example, the plurality of backup datasets may include a full file-level backup, a differential file-level backup, an incremental file-level backup, and/or a synthetic full file-level backup. In some examples, the plurality of backup datasets may include an image-level backup and/or a snapshot-based backup. For example, the plurality of backup datasets may include a full block-level backup, a differential block-level backup, an incremental block-level backup, and/or a synthetic full block-level backup. Additionally or alternatively, the plurality of backup datasets may include one or more application-level backups. For example, the plurality of backup datasets may include a full streaming application backup, an incremental streaming application backup, an application log file (e.g., including incremental backup data), and/or a block-level application backup (e.g., a full, differential, and/or incremental block-level application backup). In some examples, the plurality of backup datasets may include a backup of a virtual environment. For example, the plurality of backup datasets may include a backup generated from a host system of a virtual environment, from a virtualization management system, and/or from an agent within a virtualized environment. Generally, the plurality of backup datasets may include any combination of the backup methods listed above, including backup methods not designed, configured, and/or intended for use in combination.

In some examples, two or more backup datasets within the plurality of backup datasets may differ in scope. For example, a first backup dataset within the plurality of backup datasets may have been generated from a first backup source and a second backup dataset within the plurality of backup datasets may have been generated from a second backup source. In this example, the first backup source and the second backup source may differ in scope. For example, the first backup source may include a volume of data and the second backup source may include application data for an application (e.g., that is stored on the volume).

In some examples, two or more backup sets within the plurality of backup sets may be mutually independent. For example, a first backup dataset within the plurality of backup datasets may have been generated by a first backup job and a second backup dataset within the plurality of backup datasets may have been generated from a second backup job. In this example, the first backup job and the second backup job may have been mutually independent. For example, the first backup job may have copied and stored data for backup without reference to when the second backup job was performed and/or what data the second backup job collected. Likewise, the second backup job may have copied and stored data for backup without reference to when the first backup job was performed and/or what data the first backup job collected. Accordingly, the plurality of backup datasets may include not only backup datasets that are related and/or interdependent (e.g., a full backup followed by incremental backups at regular intervals), but also backup datasets that unrelated and independent.

In some examples, two or more backup datasets within the plurality of backup datasets may have been generated by distinct backup systems. For example, a first backup dataset within the plurality of backup datasets may have been generated by a first backup job and a second backup dataset within the plurality of backup datasets may have been generated by a second backup job. In this example, the first backup job and the second backup job may have been performed by distinct backup systems. For example, the backup system that performed the first backup job may use a separate installation and/or a separate configuration from the backup system that performed the second backup job. In some examples, the distinct backup systems may be provided by distinct vendors.

In one example, two or more backup datasets within the plurality of backup datasets may have been generated by backup systems running on distinct levels of virtualization. For example, a first backup dataset within the plurality of backup datasets may have been generated by a first backup system operating within a virtual machine (e.g., as an agent and/or as a backup system installed on the virtual machine). In this example, a second backup dataset within the plurality of backup datasets may have been generated by a second backup system operating on a host of the virtual machine. Accordingly, the first and second backup datasets may include overlapping data, albeit potentially in differing formats. For example, the first backup dataset may include files whose data may be represented within a virtual disk file within the second backup dataset. In this example, the second backup dataset may represent a backup of data from a point of view of the host (e.g., in the virtual disk file format), while the first backup dataset may represent a backup of data from a point of the virtual machine operating system (e.g., a database stored on the virtual disk). As another example, the first and second backup datasets may represent differing backup methods. For example, the second backup dataset may include a full or incremental block-level backup taken from a snapshot of the host, while the first backup dataset may include a log file within the virtual machine.

Identification module 106 may identify the plurality of backup datasets in any of a variety of ways. For example, identification module 106 may identify one or more sets of backup metadata associating backup datasets with the sources of the backup datasets. Identification module 106 may then determine which backup dataset sources may include the resource data to restore. Identification module 106 may then identify the backup datasets corresponding to these backup dataset sources as belonging to the plurality of backup datasets.

In some examples, identification module 106 may identify the plurality of backup datasets by identifying a most recent full backup dataset including the resource data. Identification module 106 may then identify each backup dataset within a backup environment generated subsequent to the most recent full backup dataset and including at least a portion of the resource data. For example, identification module 106 may identify one or more differential and/or incremental backup datasets following the full backup dataset.

Returning to FIG. 3, at step 306 one or more of the systems described herein may determine an order in which to restore the plurality of backup datasets in order to restore the resource data to the selected state. For example, at step 306 determination module 108 may, as part of computing device 202 in FIG. 2, determine an ordering 240 in which to restore backup datasets 230(1)-(n) in order to restore resource 220 to the selected state.

Determination module 108 may determine the order in any of a variety of ways. For example, determination module 108 may place a most recent full backup dataset first in the order. Determination module 108 may then place a most recent differential backup dataset after the most recent full backup dataset in the order. Determination module 108 may then place a plurality of incremental backup datasets in chronological order after the most recent differential backup dataset. In this manner, determination module 108 may place the plurality of backup datasets in such an order as to result in the state of the resource being restored to a point in time represented by the most recent incremental backup dataset in the plurality of incremental backup datasets (e.g., the incremental backup dataset corresponding to the selected state).

In some examples, determination module 108 may determine the order in which to restore the plurality of backup datasets (and, in some examples, which of the plurality of backup datasets to restore) based on a type of the resource. The type of the resource may include any of a variety of categorizations of resources. For example, the resource may be categorized as a "file system" type resource, a "database" type resource, as a "MICROSOFT EXCHANGE" type resource, etc. After identifying the type of the resource, determination module 108 may identify, based on the type of the resource, a corresponding finite state machine for ordering the plurality of backup datasets. Determination module 108 may then apply the plurality of backup datasets to the corresponding finite state machine as input in reverse chronological order (e.g., the most recent backup data set first). For example, determination module 108 may map the backup datasets within the plurality of backup datasets onto backup types. These backup types may correspond to transitions used within the corresponding finite state machine. Accordingly, determination module 108 may determine whether the current backup dataset being used as input to the corresponding finite state machine is represented in an available transition. If the type of the current backup dataset is represented, determination module 108 may record the current backup dataset as the next backup dataset in the order of restoration. If the type of the current backup dataset is not represented, determination module 108 may discard the current backup dataset from the ordering. In one example, the corresponding finite state machine may include a plurality of transitions conditioned on a backup method of each backup dataset within the plurality of backup datasets. For example, the backup method of each backup dataset may correspond to the type of the backup dataset used to determine transitions.

As used herein, the phrase "finite state machine" may refer to any suitable model of states and transitions. Accordingly, the corresponding finite state machine may be represented and/or implemented in any suitable manner. For example, the corresponding finite state machine may be represented and/or implemented with a state transition table. Additionally or alternatively, the corresponding finite state machine may be represented by a diagram specification language. In some examples, the corresponding finite state machine may be represented in the Unified Modeling Language and/or the Specification and Description Language. The corresponding finite state machine may be implemented variously using automata-based style programming, as an event-driven finite state machine, as a virtual finite state machine, and/or any other algorithm, method or paradigm capable of implementing a finite state machine from a specification or otherwise isomorphic to a finite state machine.

In some examples, determination module 108 may select the corresponding finite state machine from a database of finite state machine specifications and/or from a library of finite state machine functions. For example, the database of finite state machines may include a variety of finite state machines corresponding to various application types (e.g., a MICROSOFT EXCHANGE finite state machine, a MICROSOFT SHAREPOINT finite state machine, an IBM LOTUS DOMINO finite state machine, etc.). The database of finite state machines may include finite state machines defined based on the business logic for restoring the various applications.

Figure 4:
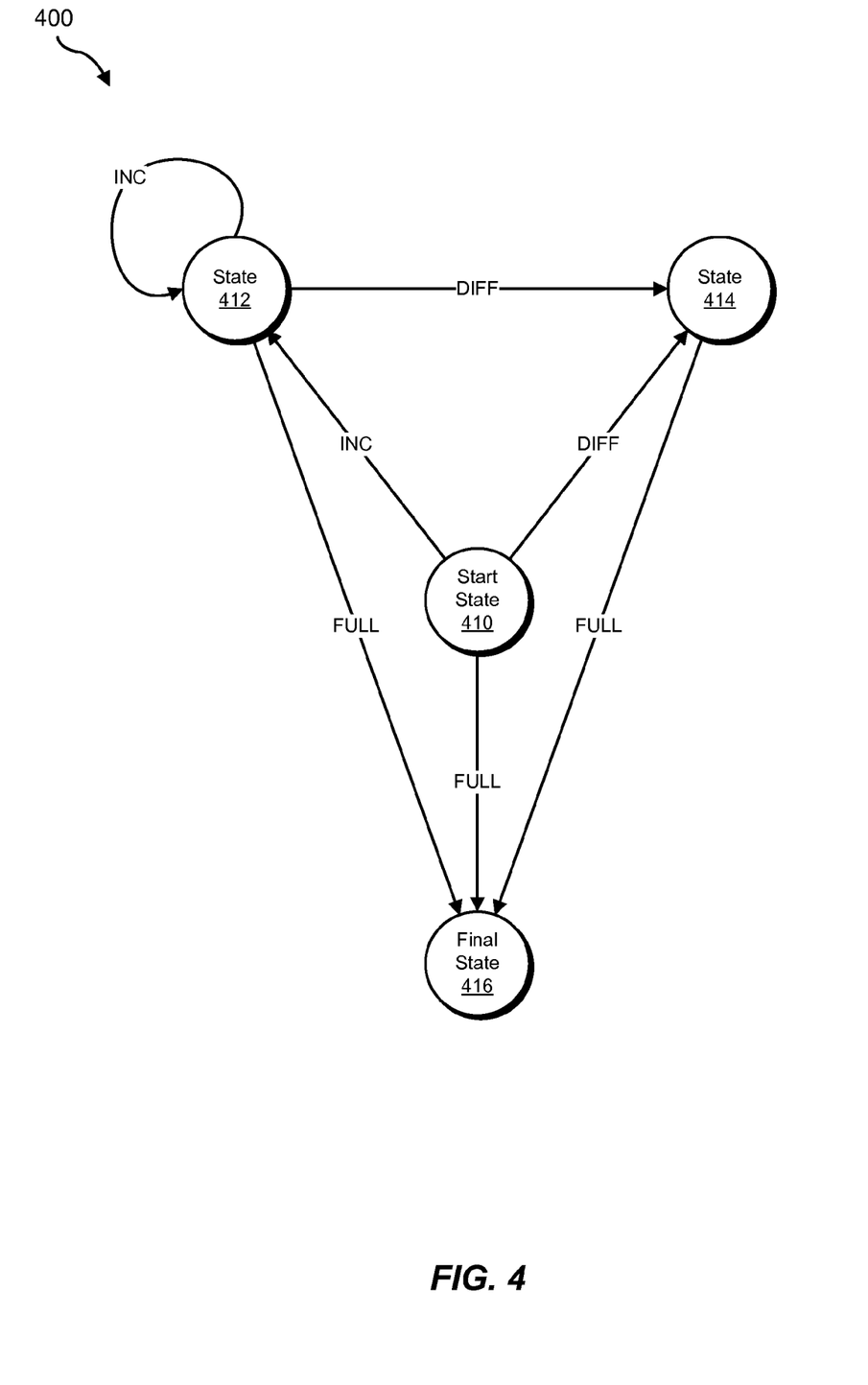
FIG. 4 is a diagram of an exemplary finite state machine for restoring application data.

FIG. 4 is a diagram of an exemplary finite state machine 400. As shown in FIG. 4, exemplary finite state machine 400 may include a start state 410, a state 412, a state 414, and a final state 416 with various transitions. Using FIG. 4 as an example, at step 306 determination module 108 may use the plurality of backup datasets in reverse chronological order as input to finite state machine 400 in order to determine what sequence of backup datasets to apply in what order so as to restore the resource to the selected state. In one example, determination module 108 may select finite state machine 400 for restoring the resource based on determining that the resource is a file system. An exemplary description of transitions for finite state machine 400 is shown in Table 1.

TABLE 1

| | |
|---|---|
| FULL | full backup dataset |
| DIFF | differential backup dataset |
| INC | incremental backup dataset |

In one example, the plurality of backup datasets may include {DIFF1, DIFF2, INC1, INC2, INC3, FULL} where INC1, INC2, and INC3 are incremental backup datasets, DIFF1 and DIFF2 are differential backup datasets, and FULL1 is a full backup dataset. Determination module 108 may then use the plurality of backup datasets in reverse chronological order (e.g., {INC3, INC2, DIFF2, DIFF1, INC1, FULL1}) as input to finite state machine 400. In this example, finite state machine 400 may, with INC3 as input, transition from start state 410 to state 412 and determination module 108 may add INC3 as last in the order. Finite state machine 400 may then, with INC2 as input, transition from state 412 to state 412 and determination module 108 may add INC2 to the front on the order. Finite state machine 400 may then, with DIFF2 as input, transition from state 412 to state 414 and determination module 108 may add DIFF2 to the front of the order. Finite state machine 400 may then, with DIFF1 as input, make no transition and determination module 108 may discard DIFF1, as there is no DIFF transition from state 414. Likewise, finite state machine 400 may, with INC1 as input, make no transition and determination module 108 may discard INC1 as there is no INC transition from state 414. Finally, finite state machine 400 may, with FULL1 as input, transition from state 414 to final state 416 and determination module 108 may add FULL1 to the front of the order. At final state 416, finite state machine 400 may terminate, with the final order as {FULL1, DIFF2, INC2, INC3}.

Figure 5:
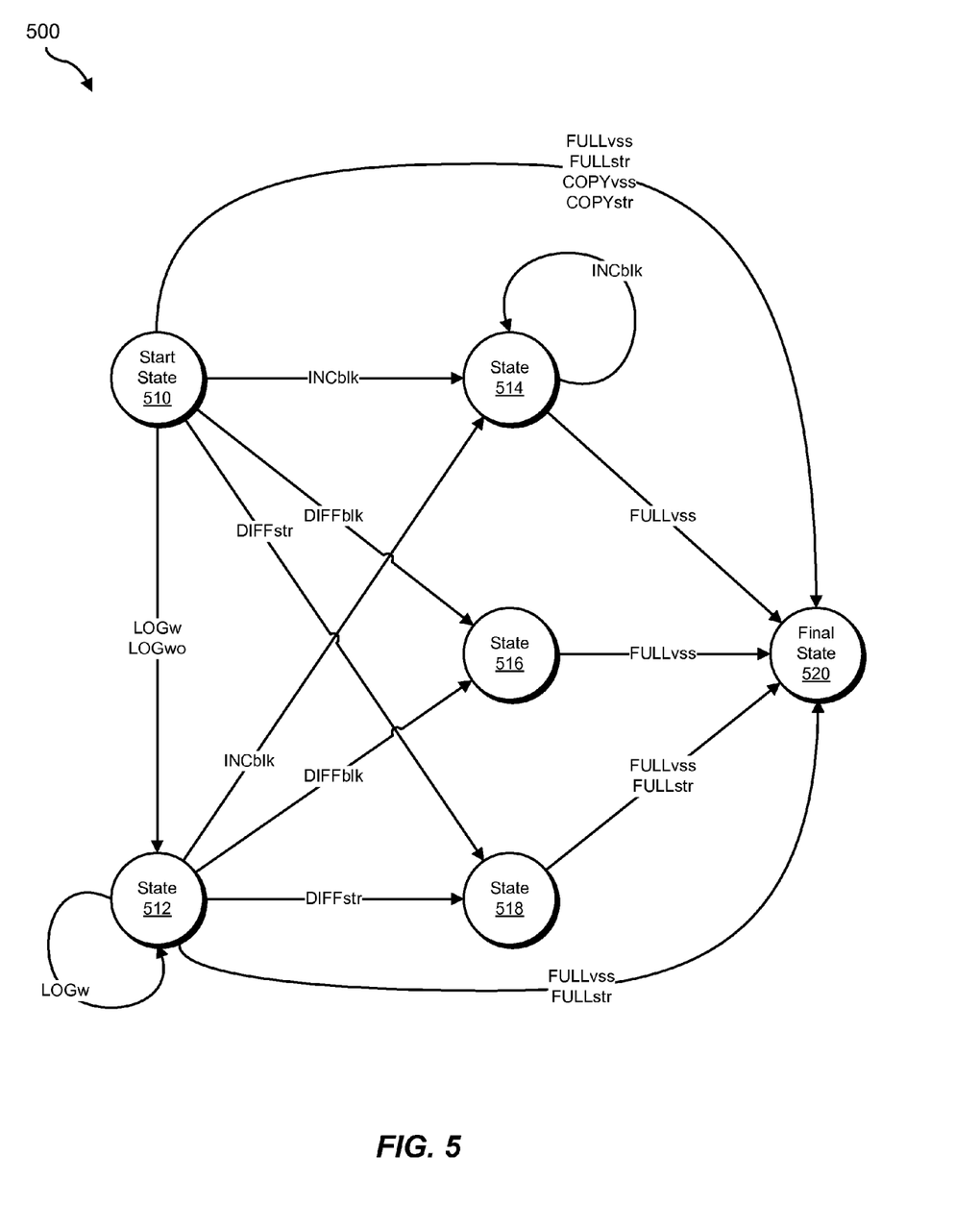
FIG. 5 is a diagram of an exemplary finite state machine for restoring application data.

FIG. 5 is a diagram of an exemplary finite state machine 500. As shown in FIG. 5, exemplary finite state machine 500 may include a start state 510, states 512, 514, 516, and 518, and a final state 520, each with various transitions. Using FIG. 5 as an example, at step 306 determination module 108 may use the plurality of backup datasets in reverse chronological order as input to finite state machine 500 in order to determine what sequence of backup datasets to apply in what order so as to restore the resource to the selected state. In one example, determination module 108 may select finite state machine 500 for restoring the resource based on determining that the resource is an SQL database. An exemplary description of transitions for finite state machine 500 is shown in Table 2.

TABLE 2

| | |
|---|---|
| FULLvss | snapshot full backup set |
| FULLstr | streaming full backup set |
| COPYvss | snapshot copy backup set |
| COPYstr | streaming copy backup set |
| LOGw | log backup set with truncation |
| LOGwo | log backup set without truncation |
| INCblk | block-level incremental backup set |
| DIFFblk | block-level differential backup set |
| DIFFstr | streaming differential backup set |

Determination module 108 may use finite state machine 500 to restore an SQL database to any of a variety of states. An exemplary timeline of backup datasets is shown in Table 3 by way of example.

TABLE 3

| TIME | BACKUP DATASET |
|---|---|
| T0 | FULLvss1 |
| T1 | LOGw1 |
| T2 | LOGw2 |
| T3 | INCblk1 |
| T4 | COPYvss1 |
| T5 | LOGw3 |
| T6 | LOGw4 |
| T7 | LOGwo1 |

As shown in Table 3, the first backup dataset may be FULLvss1 taken at time T0 and the last backup dataset may be LOGwo1 taken at time T7. In one example, an administrator may wish to restore the SQL database to time T7. In this example, determination module 108 may use the plurality of backup datasets in reverse chronological order (e.g., {LOGwo1, LOGw4, LOGw3, COPYvss1, INCblk1, LOGw2, LOGw1, FULLvss1}) as input to finite state machine 500. Finite state machine 500 may transition from start state 510 to state 512, from state 512 to state 512, from state 512 to state 512, from state 512 to state 514, and then from state 514 to final state 520, resulting in a restore order {FULLvss1, INCblk1, LOGw3, LOGw4, LOGwo1}.

In another example, an administrator may wish to restore the SQL database to time T4. In this example, determination module 108 may use the plurality of backup datasets in reverse chronological order beginning at time T4 (e.g., {COPYvss1, INCblk1, LOGw2, LOGw1, FULLvss1}). In this example, finite state machine may transition from start state 510 to final state 520, resulting in a restore order {COPYvss1}.

In an additional example, an administrator may wish to restore the SQL database to time T2. In this example, determination module 108 may use the plurality of backup datasets in reverse chronological order beginning at time T2 (e.g., {LOGw2, LOGw1, FULLvss1}). In this example, finite state machine 500 may transition from start state 510 to state 512, from state 512 to state 512, and then from state 512 to final state 520, resulting in a restore order {FULLvss1, LOGw1, LOGw2}).

As mentioned earlier, in some examples, two or more backup datasets within the plurality of backup datasets may have been generated by backup systems running on distinct levels of virtualization. For example, a first backup dataset within the plurality of backup datasets may have been generated by a first backup system operating within a virtual machine, and a second backup dataset within the plurality of backup datasets may have been generated by a second backup system operating on a host of the virtual machine. In this example, determination module 108 may determine that the first backup dataset (e.g., a most recent incremental backup of the host before the desired state, including a virtual disk image of the virtual machine) is to be restored before the second backup dataset (e.g., a log file of a database within the virtual machine).

Returning to FIG. 3, at step 308 one or more of the systems described herein may restore the resource data for the resource to the selected state by restoring the plurality of backup datasets in the order as determined. For example, at step 308 restoration module 110 may, as part of computing device 202 in FIG. 2, restore resource 220 to the selected state by restoring backup datasets 230(1)-(n) according to ordering 240.

Restoration module 110 may perform step 308 in any suitable manner. As mentioned earlier, in some examples the plurality of backup datasets may have been generated by distinct backup systems. In these examples, restoration module 110 may send each backup dataset within the plurality of backup datasets, in the determined order, to corresponding restoration systems. For example, restoration module 110 may first instruct a backup system on a host system to restore a volume of data including a virtual disk. Restoration module 110 may then instruct an additional backup system within a virtual machine that uses the virtual disk to restore data to the virtual disk.

As explained above, by identifying the backup datasets needed to restore computing resources to desired states and ordering the backup datasets for restorations to restore computing resources to desired states, the systems and methods described herein may simplify the task of restoring data in complex backup environments, thereby potentially saving time and effort for administrators and/or preventing human error.

Figure 6:
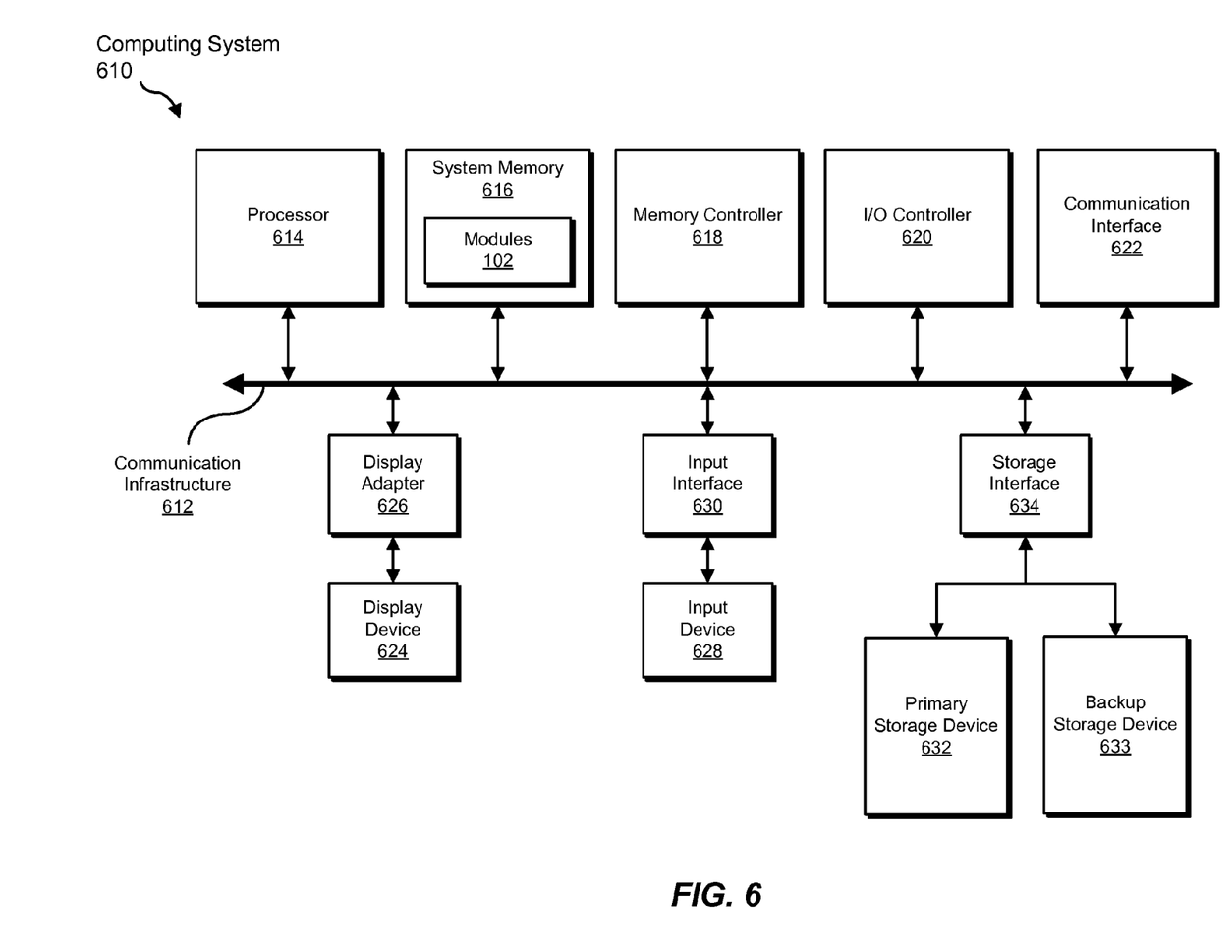
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the receiving, identifying, determining, placing, applying, and restoring steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
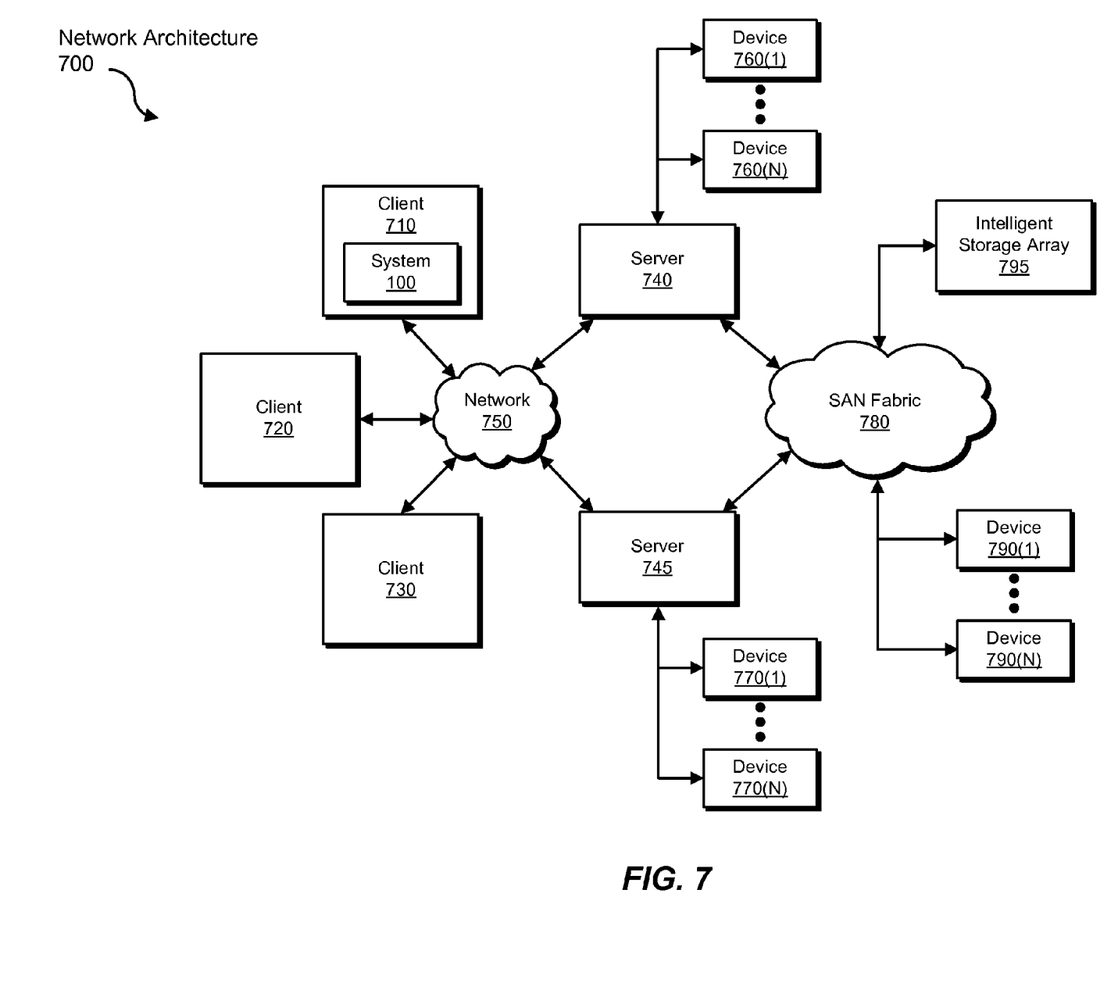
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the receiving, identifying, determining, placing, applying, and restoring steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for restoring application data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for restoring application data.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for restoring application data, at least a portion of the method being performed by a computing device comprising at least one processor, the method comprising:

receiving a request to restore primary data used by an application to a selected state;

identifying a type of the application;

identifying a plurality of backup datasets, each backup dataset within the plurality of backup datasets comprising at least a portion of backed up data that includes the primary data used by the application;

determining, based on the type of the application, an order in which to restore the plurality of backup datasets in order to restore the primary data used by the application to the selected state by:

identifying, from within a plurality of finite state machines corresponding to a plurality of application types, a finite state machine for ordering the plurality of backup datasets that corresponds to the type of the application;

applying the plurality of backup datasets to the corresponding finite state machine as input by:

mapping each backup data set within the plurality of backup datasets to a backup type that corresponds to a transition used within the corresponding finite state machine;

determining whether a current backup dataset, from within the plurality of backup datasets, being used as input to the corresponding finite state machine is represented in an available transition;

determining whether to record the current backup dataset as the next backup dataset in the order of restoration based on whether the current backup dataset is represented in an available transition;

restoring the primary data used by the application to the selected state by restoring the plurality of backup datasets in the order of restoration as determined.

2. The computer-implemented method of claim 1, wherein:
a first backup dataset within the plurality of backup datasets was generated from a first backup source;
a second backup dataset within the plurality of backup datasets was generated from a second backup source;
the first backup source and the second backup source differ in scope.

3. The computer-implemented method of claim 1, wherein:
a first backup dataset within the plurality of backup datasets was generated by a first backup job;
a second backup dataset within the plurality of backup datasets was generated from a second backup job;
the first backup job and the second backup job were at least one of:
    mutually independent;
    performed by distinct backup systems.

4. The computer-implemented method of claim 1, wherein the request to restore the primary data identifies the selected state in terms of a view of the primary data on an application level.

5. The computer-implemented method of claim 1, wherein:
the primary data comprises a file system;
determining the order in which to restore the plurality of backup datasets further comprises:
    placing a most recent full backup dataset first in the order of restoration;
    placing a most recent differential backup dataset after the most recent full backup dataset in the order of restoration;
    placing a plurality of incremental backup datasets in chronological order after the most recent differential backup dataset.

6. The computer-implemented method of claim 1, wherein applying the plurality of backup datasets to the corresponding finite state machine as input further comprises applying the plurality of backup datasets to the corresponding finite state machine as input in reverse chronological order.

7. The computer-implemented method of claim 6, wherein the corresponding finite state machine comprises a plurality of transitions conditioned on a backup method of each backup dataset within the plurality of backup datasets.

8. The computer-implemented method of claim 1, wherein:
a first backup dataset within the plurality of backup datasets was generated by a first backup system operating within a virtual machine;
a second backup dataset within the plurality of backup datasets was generated by a second backup system operating on a host of the virtual machine.

9. The computer-implemented method of claim 1, wherein:
determining whether the current backup dataset is represented in an available transition comprises determining that the current backup dataset is represented in an available transition;
determining whether to record the current backup dataset as the next backup dataset in the order of restoration comprises determining to record the current backup dataset as the next backup dataset in the order of restoration based on the determination that the current backup dataset is represented in the available transition.

10. The computer-implemented method of claim 1, wherein:
determining whether the current backup dataset is represented in an available transition comprises determining that the current backup dataset is not represented in any available transition;
determining whether to record the current backup dataset as the next backup dataset in the order of restoration comprises determining to discard the current backup dataset from the order of restoration based on the determination that the current backup dataset is not represented in any available transition.

11. A system for restoring application data, the system comprising:
a receiving module programmed to receive a request to restore primary data used by an application to a selected state;
an identification module programmed to:
    identify a plurality of backup datasets, each backup dataset within the plurality of backup datasets comprising at least a portion of backed up data that includes the primary data used by the application;
    identify a type of the application;
a determination module programmed to determine, based on the type of the application, an order in which to restore the plurality of backup datasets in order to restore the primary data used by the application to the selected state by:
    identifying, from within a plurality of finite state machines corresponding to a plurality of application types, a finite state machine for ordering the plurality of backup datasets that corresponds to the type of the application;
    applying the plurality of backup datasets to the corresponding finite state machine as input by:
        mapping each backup data set within the plurality of backup datasets to a backup type that corresponds to a transition used within the corresponding finite state machine;
        determining whether a current backup dataset, from within the plurality of backup datasets, being used as input to the corresponding finite state machine is represented in an available transition;

determining whether to record the current backup dataset as the next backup dataset in the order of restoration based on whether the current backup dataset is represented in an available transition;

a restoration module programmed to restore the primary data used by the application to the selected state by restoring the plurality of backup datasets in the order of restoration as determined;

at least one hardware processor that executes the identification module, the receiving module, the identification module, the determination module, and the restoration module.

12. The system of claim 11, wherein:
a first backup dataset within the plurality of backup datasets was generated from a first backup source;
a second backup dataset within the plurality of backup datasets was generated from a second backup source;
the first backup source and the second backup source differ in scope.

13. The system of claim 11, wherein:
a first backup dataset within the plurality of backup datasets was generated by a first backup job;
a second backup dataset within the plurality of backup datasets was generated from a second backup job;
the first backup job and the second backup job were mutually independent.

14. The system of claim 11, wherein:
a first backup dataset within the plurality of backup datasets was generated by a first backup job;
a second backup dataset within the plurality of backup datasets was generated from a second backup job;
the first backup job and the second backup job were performed by distinct backup systems.

15. The system of claim 11, wherein:
the primary data comprises a file system;
the determination module is further programmed to determine the order in which to restore the plurality of backup datasets by:
placing a most recent full backup dataset first in the order of restoration;
placing a most recent differential backup dataset after the most recent full backup dataset in the order of restoration;
placing a plurality of incremental backup datasets in chronological order after the most recent differential backup dataset.

16. The system of claim 11, wherein the determination module is further programmed to apply the plurality of backup datasets to the corresponding finite state machine as input in reverse chronological order.

17. The system of claim 11, wherein the corresponding finite state machine comprises a plurality of transitions conditioned on a backup method of each backup dataset within the plurality of backup datasets.

18. The system of claim 11, wherein:
a first backup dataset within the plurality of backup datasets was generated by a first backup system operating within a virtual machine;
a second backup dataset within the plurality of backup datasets was generated by a second backup system operating on a host of the virtual machine.

19. A non-transitory computer-readable-storage medium comprising one or more computer-executable instructions that, when executed by at least one processor of a computing device, cause the computing device to:
receive a request to restore primary data used by an application to a selected state;
identify a type of the application;
identify a plurality of backup datasets, each backup dataset within the plurality of backup datasets comprising at least a portion of backed up data that includes the primary data used by the application;
determine, based on the type of the application, an order in which to restore the plurality of backup datasets in order to restore the primary data used by the application to the selected state by:
identifying, from within a plurality of finite state machines corresponding to a plurality of application types, a finite state machine for ordering the plurality of backup datasets that corresponds to the type of the application;
applying the plurality of backup datasets to the corresponding finite state machine as input by:
mapping each backup data set within the plurality of backup datasets to a backup type that corresponds to a transition used within the corresponding finite state machine;
determining whether a current backup dataset, from within the plurality of backup datasets, being used as input to the corresponding finite state machine is represented in an available transition;
determining whether to record the current backup dataset as the next backup dataset in the order of restoration based on whether the current backup dataset is represented in an available transition;
restore the primary data used by the application to the selected state by restoring the plurality of backup datasets in the order of restoration as determined.

20. The non-transitory computer-readable-storage medium of claim 19, wherein:
a first backup dataset within the plurality of backup datasets was generated from a first backup source;
a second backup dataset within the plurality of backup datasets was generated from a second backup source;
the first backup source and the second backup source differ in scope.

* * * * *